3,070,431
METHOD OF INHIBITING AND DESTROYING THE GROWTH OF UNDESIRABLE PLANTS
Lee Alan Miller, Dayton, Ohio, assignor to Monsanto Chemical Company, St. Louis, Mo., a corporation of Delaware
No Drawing. Filed June 24, 1959, Ser. No. 822,433
7 Claims. (Cl. 71—2.3)

This invention relates to the control of plant systems, including germinate seeds, emerging seedlings, and fully developed plants. In one aspect, this invention relates to valuable herbicidal compositions. In another aspect, this invention relates to methods for destroying undesirable plant vegetation without substantially affecting desirable plant vegetation. In another aspect, this invention relates to methods for preventing the germination of seeds of undesirable plants and for preventing the growth of emerging seedlings of said plants.

In recent years, the use of chemicals for affecting plant systems have found wide spread acceptance among agriculturists. For example, chemical compositions have been applied to fully developed vegetation to destroy the same in either a selective or non-selective manner. It is relatively easy to destroy the aerial portion of developed vegetation because the vegetation is brought into direct contact with the herbicide compositions; however, it is sometimes more difficult to achieve a lethal effect on germinate seeds lying in the soil and seedlings emerging from the soil. Destruction of germinate seeds and emerging seedlings is important in preventing the regrowth of the plants after the herbicide composition has been either washed away by rainfall or dissipated by other actions. Unfortunately, it is usually necessary to use an excessive amount of the herbicide compositions in order to affect the germinate seeds and emerging seedlings to thereby achieve long lasting plant control. The extended control of plant life during the growth of certain undesirable grasses and weeds such as crab grass and foxtail. Obviously, a more bountiful growth of desirable grasses and crop plants will result if growth of these undesirable weeds and grasses is prevented before the soil is depleted of moisture and nutrients.

I have discovered that the hemiacetals of acetylenic cyclohexanols and halogenated aldehydes affect plant systems, including fully developed vegetation as well as germinate seeds and emerging seedlings, in a manner to destroy said vegetation and prevent the germination of said seeds and the growth of said seedlings.

An object of this invention is to provide a valuable herbicide composition having a high degree of persistency.

Another object of this invention is to provide a novel herbicide composition having a high toxicity and having a high effectiveness in small dosages.

Another object of this invention is to provide a new herbicide composition which exhibits selectivity in affecting certain undesirable plant systems without affecting desirable plant systems.

Another object of this invention is to provide methods for the suppression and control of undesirable vegetation growing intermingled with desirable vegetation.

Another object of this invention is to provide methods for preventing the germination of seeds of undesirable plants and for preventing the growth of undesirable emerging seedlings in soil which is planted with seeds of desirable vegetation.

Other aspects, objects and advantages of the invention are apparent from the consideration of the accompanying disclosure and the appended claims.

According to the present invention, there are provided herbicide compositions comprising a carrier adjuvant and, as an essential active ingredient, a toxic or growth-inhibiting amount of an hemiacetal of acetylenic cyclohexanol and halogenated aldehyde, as illustrated by the following structural formula

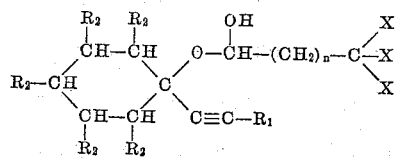

wherein $R_1$ and $R_2$ are selected from the group consisting of hydrogen, alkyl, aryl, and aralkyl radicals, said alkyl radicals each containing from 1 to 4 carbon atoms, $n$ is an integer of from 0 to 3, and X is selected from the group consisting of hydrogen, methyl, chlorine and bromine, at least two of said X being selected from the group consisting of chlorine and bromine.

Also, according to the present invention, there are provided methods for affecting certain undesirable plant systems, including fully developed vegetation as well as germinate seeds and emerging plant seedlings, in a manner to destroy said vegetation and to prevent the growth of said seeds and said emerging seedlings by the application of a toxic or growth-inhibiting amount of said herbicide composition of an hemiacetal of acetylenic cyclohexanol and halogenated aldehyde thereto.

The hemiacetals comprising the essential active ingredient in the herbicide compositions of this invention are readily available compounds which are usually made by condensing the acetylenic alcohol with the halogenated aldehyde under anhydrous conditions at substantially room temperature. As is well known, acetal formation takes place at the carbonyl group of the aldehyde, the reaction resulting not only in the formation of a hydroxy group, but in the formation, as well, of an ether linkage between the carbon atom of the aldehyde carbonyl group and the carbon atom to which the hydroxy radical of the acetylenic alcohol is attached.

The following hemiacetals of acetylenic cyclohexanols and halogenated aldehydes are representative of the compounds included within the scope of the structural formula given above:

2,2-dichloro-1-(1-ethynylcyclohexyloxy)-ethanol
2,2,2-trichloro-1-(1-ethynylcyclohexyloxy)-ethanol
2,2-dibromo-1-(1-ethynylcyclohexyloxy)-ethanol
2,2,2-tribromo-1-(1-ethynylcyclohexyloxy)-ethanol
2,2-dichloro-1-(1-ethynylcyclohexyloxy)-propanol
3,3-dichloro-1-(1-ethynylcyclohexyloxy)-propanol
3,3,3-trichloro-1-(1-ethynylcyclohexyloxy)-propanol
2,2-dibromo-1-(1-ethynylcyclohexyloxy)-propanol
3,3-dibromo-1-(1-ethynylcyclohexyloxy)-propanol
3,3,3-tribromo-1-(1-ethynylcyclohexyloxy)-propanol
3,3-dichloro-1-(1-ethynylcyclohexyloxy)-butanol
4,4,4-trichloro-1-(1-ethynylcyclohexyloxy)-butanol
4,4,4-tribromo-1-(1-ethynylcyclohexyloxy)-butanol
3,3-dibromo-1-(1-ethynylcyclohexyloxy)-butanol
4,4-dibromo-1-(1-ethynylcyclohexyloxy)-butanol
4,4-dichloro-1-(1-ethynylcyclohexyloxy)-pentanol
5,5,5-trichloro-1-(1-ethynylcyclohexyloxy)-pentanol
4,4-dibromo-1-(1-ethynylcyclohexyloxy)-pentanol
5,5,5-tribromo-1-(1-ethynylcyclohexyloxy)-pentanol
2,2,2-trichloro-1 - [1 - (1-propynyl)-cyclohexyloxy)]-ethanol
2,2-dichloro-1-[1-(1-propynyl)-cyclohexyloxy]-propanol
3,3,3-trichloro-1 - [1 - (1-propynyl)-cyclohexyloxy]-propanol
2,2,2-trichloro-1-[1-(1-butynyl)-cyclohexyloxy]-ethanol
2,2-dichloro-1-[1-(1-butynyl)-cyclohexyloxy]-butanol
3,3,3-trichloro-[1-(1-butynyl)-cyclohexyloxy]-butanol
2,2,2-trichloro-1-[1-(1-butynyl)-cyclohexyloxy]-butanol
2,2,2-trichloro-1-[1-(1-hexynyl)-cyclohexyloxy]-ethanol 2,2,2-trichloro-1 - (1 - phenylethynylcyclohexyloxy)-ethanol 2,2,2 - trichloro-1-[1-ethynyl-3-phenylcyclohexyloxy]-ethanol 2,2,2 - trichloro-1-[1-(1-butynyl)-4-phenylcyclohexyloxy]-ethanol 2,2-dibromo-1-(1-phenylethynylcyclohexyloxy)-propanol 3,3,3-tribromo-1 - (1 - phenylethynylcyclohexyloxy)-propanol 2,2,2-trichloro-1-(1-ethenyl - 2 - methylcyclohexyloxy)-ethanol 2,2,2-trichloro-1 - (1 - ethynyl-2-n-propylcyclohexyloxy)-ethanol 2,2,2 - trichloro-1-(1-ethynyl-2,4-dimethylcyclohexyloxy)-ethanol 2,2,2-trichloro-1-(1-ethynyl - 2 - ethylcyclohexyloxy)-ethanol 2,2-dibromo-(1-ethynyl - 2,6 - di-n-propylcyclohexyloxy)-propanol 3,3,3 - tribromo-(1-ethynyl - 2,6 - di-n-propylcyclohexyloxy)-propanol The herbicidal compositions of this invention can be either liquid or dusts containing the hemiacetals of acetylenic cyclohexanol and halogenated aldehyde admixed with suitable liquid or finely-divided solid adjuvant carriers. These liquid and dust compositions can also contain, in addition to the carrier adjuvants, other additaments, such as fertilizers, and pesticides.

Liquid compositions containing the desired amount of hemiacetals can be prepared by dissolving the hemiacetal compound in an organic solvent, including hydrocarbon liquids such as kerosene, hexane, benzene, toluene, acetone, cyclohexanone, methylethylketone, and the like. These hemiacetal toxicants are substantially insoluble in water; however, liquid compositions can be made by dispersing a finely-divided hemiacetal in water using a suitable dispersing agent. Also, if desired, liquid compositions can be formed by dispersing the organic liquid composition containing the dissolved hemiacetal in water solutions to form an emulsion with the aid of a suitable dispersing and emulsifying agent. Dispersing agents employed in these compositions are oil soluble and include non-ionic emulsifiers such as the condensation products of alkylene oxide with phenols and organic acids, polyoxyethylene derivatives of sorbitan esters, complex ether alcohols and the like. Ordinarily, the concentration of the hemiacetal toxicant in the liquid composition will comprise from 1 to 95% by weight of the total composition.

In dust compositions, the hemiacetal toxicant is dispersed in finely-divided solid materials such as talc, chalk, gypsum, fuller's earth, clay and the like. Other very suitable carriers also include the solid fertilizers, such as ammonium nitrates and super-phosphates, as well as other materials in which plant organisms may take root and grow, such as compost, manure, humus, sand and the like. Preferably, the dust compositions are prepared by grinding or mixing the normally solid hemiacetal toxicant with the inert solid carrier using surface active dispersing agents if desired. The concentration of the hemiacetal toxicant in the dust composition can vary over wide ranges and preferably comprises from 5 to 95% by weight of the total composition.

The herbicide compositions of this invention are applied to the plant systems in the conventional manner. Thus, the dust and liquid compositions may be applied to the foliage of growing plants by the use of power-dusters, broom and hand sprayers, and spray-dusters. These compositions can also be very suitably applied from airplanes as dusts or sprays because the herbicide compositions of this invention are effective in very low dosages. In order to prevent the growth of germinate seeds or emerging seedlings, the dust and liquid compositions are applied to the soil according to conventional methods, and, preferably, distributed in the soil to a depth of at least one-half inch below the soil surface. It is not absolutely necessary that the herbicide composition be admixed with the soil particles and these compositions can be applied merely by spraying or sprinkling onto the surface of the soil. Thus, these herbicide compositions can be applied by addition to irrigation water supplied to the field to be treated. This method of application will permit the penetration of the compositions into the soil as the water is adsorbed therein. Dust compositions sprinkled on the surface of the soil can be distributed below the surface of the soil by the usual discing, dragging or mixing operations.

The application of a growth-inhibiting amount or toxic amount of the hemiacetal compound to the plant system is essential in the practice of the present invention. The exact dosage to be applied is dependent upon the plant species to be controlled and the stage of growth thereof as well as the part of the plant to be contacted with the toxicant. In non-selective foliage treatments, the herbicide compositions of this invention are applied at a rate sufficient to obtain from 5 to 20 pounds of hemiacetal per acre. In selective applications to the soil, a dosage of from 1 to 5 pounds of toxicant per acre is employed. Although the present hemiacetals possess general herbicidal activity when used in foliage contact sprays in dust, selective effects are demonstrated when employed as pre-emergent herbicides to prevent the germination of seeds and the growth of emerging seedlings. When applied at the low rate of 3 pounds per acre, the effect on radish-mustard, foxtail and crab grass is quite severe whereas there is substantially no effect on wild oats, brome cheat grass, rye grass, soybean, wild buckwheat, tomato, and sugar beets.

The advantages, desirability and usefulness of the present herbicide composition are illustrated by the following example. In this example 2,2,2-trichloro-1-(1-ethynylcyclohexyloxy)-ethanol was tested as a pre-emergent herbicide. The soil for these tests comprised a good grade of top soil which had been screened through a one-half inch wire mesh and mixed with sand in a proportion of 2 parts of the top soil to 1 part of the sand. The soil was then placed in aluminum pans, 13" x 9" x 2", and compacted to a depth of ⅜ inch from the top of the pan. Five seeds of each of tomato, morning glory, radish-mustard, and sorghum, ten seeds of sugar beet, 20 seeds of wild buckwheat, wild oats, crab grass, rye grass and barnyard grass, and from 20 to 30 seeds of pigweed were then placed on top of the packed soil in an arrangement whereby one-third of the area of the soil surface at one end of the pan was scattered randomly with the broad-leaf plants and another one-third of the area of the soil surface at the other end of the pan was scattered with the narrow-leaf plants. In the one-third area of the soil surface between the areas containing seeds, 10 brome cheat grass seeds and 3 soybean seeds were placed in a row. The seeds were then covered with soil to the top of the pan and the surface of the soil sprayed with 30 cc. of an aqueous solution of a liquid fertilizer.

The herbicidal solution was prepared by dissolving 0.2 g. of 2,2,2-trichloro - 1 - (1-ethynylcyclohexyloxy)-ethanol in 25 cc. of acetone. Three cc. of this stock solution was diluted with water to 30 cc. and this solution was sprayed over the entire area of the pre-planted pan to correspond to an application rate of 3 pounds of the hemiacetal per acre.

Another pan containing the above seeds was prepared in the same manner as described above except that 30 cc. of the hemiacetal solution was admixed with the soil which was placed over the compact surface containing the seeds.

In a third planted pan, the planting of the seeds was conducted in the same manner as above except that acetal solution was not added to the soil, but the soil was treated with the liquid fertilizer solution. This pan constituted a blank for assessment of the herbicidal activity of the hemiacetal solutions.

The three pans containing planted seeds therein were then placed in ⅛ inch of water and allowed to adsorb moisture through perforated bottoms until the soil surface was completely moist. The pans were then transferred to a wet sand bench in a greenhouse and maintained there for 14 days under ordinary conditions of sunlight and watering.

Observation of the pans at the end of that time disclosed that the pan sprayed on the surface with a hemiacetal solution at a rate of 3 pounds per acre had a very severe effect on radish-mustard, foxtail and crab grass and no seedings of these plants emarged. At this rate, the effect on morning glory, pigweed and sorghum was very slight and seedlings of these seeds had emerged. This rate of application of the hemiacetal solution had no effect on wild oats, brome cheat, rye grass, soybean, wild buckwheat, tomato, and sugar beet since the seedings from these seeds had emerged and were growing just as well as those in the blank pan.

Observation of the pan in which the hemiacetal solution had been admixed with the top layer of soil, disclosed that the herbicide composition was more effective when distributed in this manner. Thus, although there was a severe effect on radish-mustard, foxtail and crab grass, there was also a moderate effect on pigweed and soybean. Under these conditions of application, there was only slight effect on sugar beets and no effect on morning glory, wild oats, brome cheat, rye grass, wild buckwheat, tomato and sorghum.

Reasonable variation and modification are possible within the scope of the foregoing disclosure and the appended claims, the essence of which is that there have been provided herbicidal compositions comprising a carrer adjuvant and, as an essential active ingredient, a toxic or growth-inhibiting amount of an hemiacetal of acetylenic cyclohexanol and halogenated aldehyde and methods for suppression and control of undesirable vegetation, including full grown plants as well as germinate seeds and emerging seedlings.

I claim:
1. A method for preventing plant growth which comprises applying to soils normally supporting said growth a growth inhibiting amount of a herbicidal composition comprising 2,2,2-trichloro-1-(1-ethynylcyclohexyloxy)ethanol.

2. A method for preventing the undesirable growth of plants which comprises distributing on the surface of soil containing seeds of said plants a growth-inhibiting amount of 2,2,2-trichloro-1-(1-ethynylcyclohexyloxy)ethanol.

3. A method for preventing the undesirable growth of plants which comprises intimately admixing soil containing seeds of said plants with a growth-inhibiting amount of 2,2,2-trichloro-1-(1-ethynylcyclohexyloxy)ethanol.

4. A method for selectively preventing the growth of crab grass which comprises applying to the soil containing germinate seeds of crab grass a growth-inhibiting amount of 2,2,2-trichloro-1-(1-ethynylcyclohexyloxy)ethanol.

5. A method of destroy undesirable plants which comprises applying to said plant a toxic amount of herbicidal composition comprising 2,2,2-trichloro-1-(1-ethynylcyclohexyloxy)ethanol.

6. A method for preventing the undesirable growth of plants which comprises contacting the seeds of said plants while positioned in the soil with a growth inhibiting amount of 2-trichloro-1-(1-ethynylcyclohexyloxy)ethanol.

7. A method for preventing the undesirable growth of plants which comprises impregnating the soil with a growth inhibiting amount of 2,2,2-trichloro-1-(1-ethynylcyclohexyloxy)ethanol.

References Cited in the file of this patent
UNITED STATES PATENTS

| | | |
|---|---|---|
| 2,657,241 | Mast et al. | Oct. 27, 1953 |
| 2,802,878 | Monroe et al. | Aug. 13, 1957 |
| 2,897,241 | Watson | July 28, 1959 |
| 2,946,825 | Monroe et al. | July 26, 1960 |